United States Patent
Vaughn, Jr.

(10) Patent No.: US 8,763,556 B1
(45) Date of Patent: Jul. 1, 2014

(54) SOFT PETAL FLOWER PORT FOR HUMMINGBIRD FEEDERS

(75) Inventor: William R. Vaughn, Jr., Lititz, PA (US)

(73) Assignee: Woodstream Corporation, Lititz, PA (US)

(\*) Notice: Subject to any disclaimer, the term of this patent is extended or adjusted under 35 U.S.C. 154(b) by 182 days.

(21) Appl. No.: 13/267,368

(22) Filed: Oct. 6, 2011

Related U.S. Application Data

(60) Provisional application No. 61/344,794, filed on Oct. 8, 2010.

(51) Int. Cl.
*A01K 7/00* (2006.01)

(52) U.S. Cl.
USPC .......... 119/74; 119/57.8; 119/72; 119/52.2; 119/57.9; 119/52.3

(58) Field of Classification Search
USPC ......... 119/51.01, 57.8, 52.1, 52.2, 57.9, 52.3, 119/72, 74, 53, 51.11, 61.3, 61.31, 429, 119/72.5, 73, 75–81; D30/121, 124–128, D30/131, 132
See application file for complete search history.

(56) References Cited

U.S. PATENT DOCUMENTS

| | | | |
|---|---|---|---|
| 3,125,069 A * | 3/1964 | Fowler | 119/77 |
| D382,376 S | 8/1997 | Bescherer | |
| 5,806,460 A | 9/1998 | Klein | |
| D454,669 S | 3/2002 | Lieb | |
| 7,685,969 B2 | 3/2010 | Stone et al. | |
| 8,011,323 B2 | 9/2011 | Vaughn, Jr. et al. | |
| 2007/0173555 A1* | 7/2007 | Loo | 521/131 |
| 2007/0272161 A1* | 11/2007 | Stone et al. | 119/51.01 |
| 2009/0308321 A1* | 12/2009 | Szczygiel-Durante | 119/72 |
| 2009/0320765 A1* | 12/2009 | Gauker et al. | 119/75 |
| 2010/0024738 A1* | 2/2010 | Chen et al. | 119/72 |

\* cited by examiner

*Primary Examiner* — Andrea Valenti
(74) *Attorney, Agent, or Firm* — Jacobson Holman, PLLC.

(57) ABSTRACT

A hummingbird feeder having one or more soft petal feeding ports, each port having a three-dimensional simulated flower made of a soft, flexible plastic or rubber-type material having a durometer reading not to exceed 50A based on ASTM standard D2240 is provided. The petals are pliable so as to be easily manipulated by a hummingbird coming into contact with them, and provide a texture and resistance comparable to that of natural flower petals.

1 Claim, 5 Drawing Sheets

SOFT PETAL FLOWER PORT FOR HUMMINGBIRD FEEDERS

This application is entitled to and hereby claims the priority of U.S. Provisional Application Ser. No. 61/344,794, filed Oct. 8, 2010.

BACKGROUND OF THE INVENTION

1. Field of the Invention

The present invention relates to the field of bird feeders and, more particularly, to a hummingbird feeder having feeding ports with ornamental flowers made of soft plastic or rubber-type material to better simulate real flowers.

2. Description of the Related Art

Hummingbird feeders have feeding ports with a small opening through which hummingbirds access nectar or nectar-like liquids stored in the feeder. Conventionally, these small openings are surrounded by an ornamental structure of hard molded plastic made to look like a flower in order to be attractive to hummingbirds. Such structures are very inflexible and, except for their appearance as seen by human beings, bear little resemblance to real flowers with their delicate petals from which hummingbirds naturally feed.

As shown in FIG. 1, prior art hummingbird feeders include those like that shown in U.S. Design Pat. No. D454,669 in which a three-dimensional ornamental flower is provided. Other styles are representatively depicted by U.S. Design Pat. No. D382,376, shown in FIG. 2, in which the flower is essentially two-dimensional and lays flat against the body of the feeder. In both of these feeder design types, the flower is made of an inflexible material, generally having a durometer reading of about 100 based on ASTM standard D2240 (Shore A scale). Such hardness is unnatural for hummingbirds.

Three-dimensional flowers of the type known in the prior art can also present some risk to the hummingbird arising from inadvertent contact with the hard petals. This can occur when several hummingbirds interact competitively for access to the feeder or to intimidate one another for control of the area surrounding the feeder.

Therefore, a need exists for a hummingbird feeder that is more natural in appearance and which more closely mimics real flowers in order to both attract more hummingbirds and ensure their safety while in the vicinity of the feeder.

SUMMARY OF THE INVENTION

In view of the foregoing, one object of the present invention is to provide a hummingbird feeder having soft petal feeding ports that more closely simulate real flowers.

Another object of the present invention is to provide a hummingbird feeder in accordance with the preceding object in which the feeding ports include simulated flowers made of a soft, flexible yet durable material so that the petals bend more readily when contacted by the hummingbirds.

A further object of the present invention is to provide a hummingbird feeder that is not complex in structure and which can be manufactured at low cost, but yet closely simulates the appearance and texture of real flowers to attract more hummingbirds and ensure their safety when feeding.

In accordance with these and other objects, the present invention is directed to a hummingbird feeder having one or more soft petal feeding ports, each port having a three-dimensional simulated flower made of a soft, flexible, plastic (polymer) or rubber-type material having a low durometer reading, preferably less than 50 based on ASTM standard D2240 (Shore A scale). The petals are pliable so as to be readily manipulated upon contact by a hummingbird therewith, providing a resistance to the hummingbird which is comparable to that of natural flower petals and leaves.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

Figure 1:
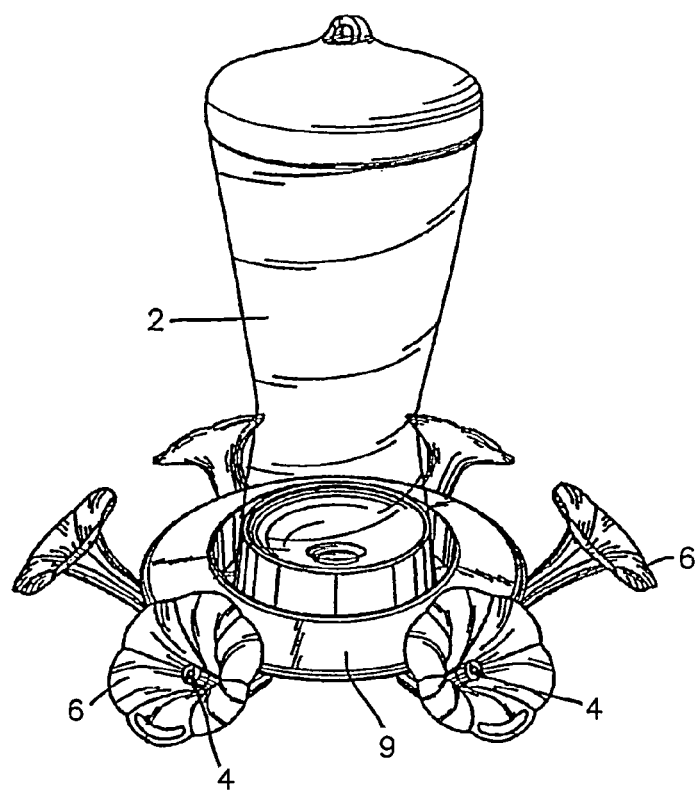
FIG. 1 is a side perspective view of a conventional hummingbird feeder as depicted in the prior art.

In describing preferred embodiments of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

Figure 3:
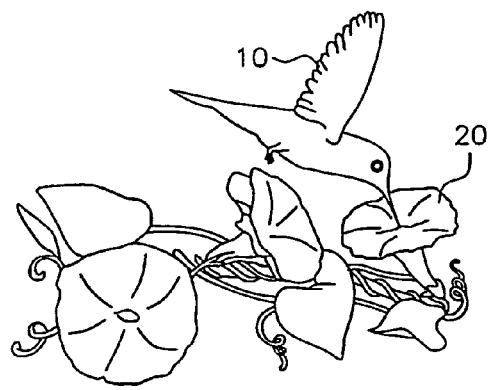
FIG. 3 is a side perspective view of a hummingbird feeding from a real flower.

Hummingbirds flap their wings very rapidly. For example, a ruby-throated hummingbird flaps it wings about 55 times per second. As shown in FIG. 3, a hummingbird 10 feeding naturally at a flower 20 can move freely amongst the petals with no risk of injury to itself arising from its rapid wing beat and possible contact between its wings and the flowers.

Figure 2:
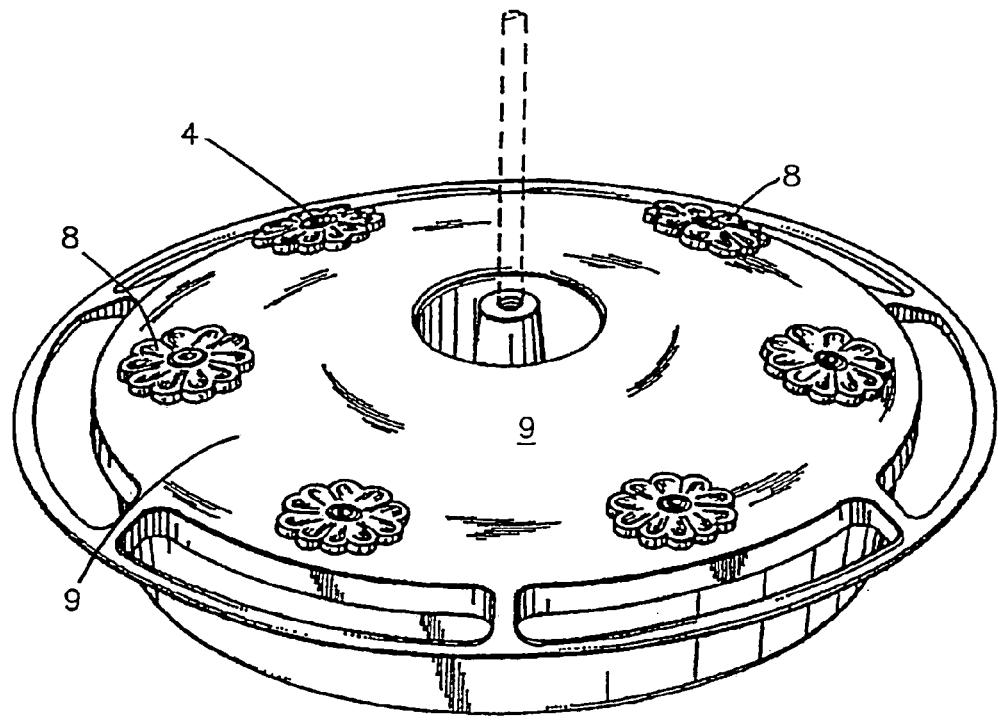
FIG. 2 is a side perspective view of another conventional hummingbird feeder as depicted in the prior art.

As shown in FIG. 1, hummingbird feeders include an upstanding container or reservoir 2 which is typically positioned centrally above a feeding or nectar basin 9. Spaced around the feeding or nectar basin 9 are a plurality of apertures or feeding ports 4. Surrounding and defining the feeding ports 4 are three-dimensional flowers 6 to attract the hummingbirds to the feeding ports. Prior art feeders having rigid three-dimensional flowers 6, such as that shown in FIG. 1, present some risk to the hummingbird through inadvertent contact and also do not correspond with natural flowers in their appearance or behavior. Two-dimensional flowers on hummingbird feeders such as that shown in FIG. 2 do not present any risk to the hummingbird. However, the manner in which the feeding port is presented, with a flat flower 8 affixed against the feeding basin 9, is not a natural configuration, and does not draw hummingbirds in to feed until they have become "trained" by prolonged exposure to the feeder to understand this configuration as representing a feeding port.

Figure 4:
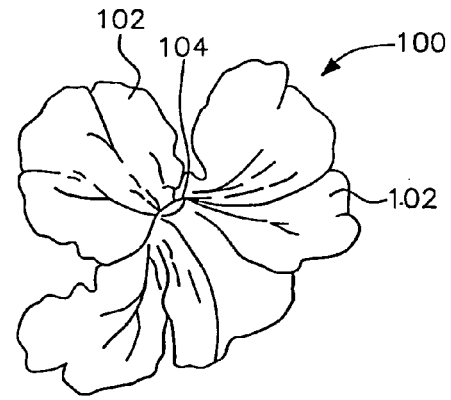
FIG. 4 is a front perspective view of a soft petal flower port in accordance with the present invention for use with a hummingbird feeder.

Accordingly, the present invention is directed to a soft petal flower port 100, as shown in FIG. 4, and suitable for use with a hummingbird feeder. The port is made to look like a flower and has easily pliable flower petals 102 arranged around a central feeding port opening 104. The petals are made of a low durometer-reading material that is soft and yet durable. Petals 102 will maintain their shape during normal operation, but can be easily moved and manipulated by a hummingbird 10 such that the petals provide a resistance level consistent with that of natural flowers and leaves. In other words, should a hummingbird's wings contact petal 102 of flower port 100 while flapping, the petal will deform so that the hummingbird's wings are not injured.

Preferably, flower port 100, or at least petals 102 are made from a plastic (i.e., a polymer or co-polymer) or rubber-type material having a durometer reading not exceeding 50A based on ASTM standard D2240. The indicia "50A" and "49A" as used herein is intended as short-hand for a reading of 50 and 49, respectively, on the Shore A scale of ASTM standard D2240. Further, for purposes of this application, the term "polymer" shall, unless specifically stated otherwise, include both polymers and copolymers.

Preferably, the polymer used in the present invention is a thermoplastic elastomer (TPE). In general TPE's are a class of copolymers or a physical mix of polymers (usually a plastic and a rubber) which contain materials with both thermoplastic and elastomeric properties. TPE's show both advantages typical of rubbery materials and plastic materials. The physical differences between thermoset elastomers—which cure irreversibly—and thermoplastic elastomers—which can be re-melted and re-molded—is the type of crosslinking bond in their structures. Crosslinking is a critical structural factor which contributes to the elastic properties of elastomers. The crosslink in thermoset polymers is a covalent bond created during the vulcanization (curing) process. On the other hand, the crosslink in TPE's is generally a weaker dipole or hydrogen bond or takes place in one of the phases of the material.

In order to qualify as a thermoplastic elastomer, a TPE has three general, common characteristics: (1) an ability to be stretched to moderate elongations and, upon the removal of stress, return to something close to its original shape; (2) processable as a melt at elevated temperature; and (3) an absence of significant creep (the tendency of a solid material to slowly move or deform permanently under the influence of stresses.) The most common classes of TPE's are styrenic block copolymers, polyolefin blends, elastomeric alloys, thermoplastic polyurethanes, thermoplastic copolyester and thermoplastic polyamides.

A preferred TPE for use in making the soft flower ports of the present invention is available from Fujian Jinjiang Jiahairun Plastic Tech. Co., Ltd; Qianpuxilu Industrial Park, Cizao; Jinjiang, Fujian China, under the name Supolymer H261-502P12200. This polymer has the following properties:

| Hardness | ASTM D2240 | 49 |
|---|---|---|
| Density | ASTM D792 | 1.09 g/cm3 |
| Tensile Strength | ASTM 412 | 47 kg/cm2 |
| Rupture Elongation Rate | ASTM D412 | 640% |
| Tear Strength | ASTM D624 | 20 kg/cm |

Because hummingbird feeders are typically used outdoors, the TPE used to make the flower ports of the present invention should contain an ultraviolet (UV) inhibitor. A preferred UV inhibitor is 2(2-hydroxy-3,5-ditert-butylphenyl)-5-chloro-benztriazole, as shown by the following formula:

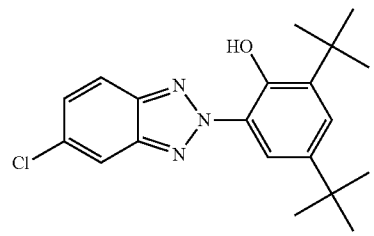 [SMILES: CC(C)(C)c1cc(-n2nc3ccc(Cl)cc3n2)c(O)c(C(C)(C)C)c1]

Of course, other suitable UV-inhibitors may also be used.

Figure 5:
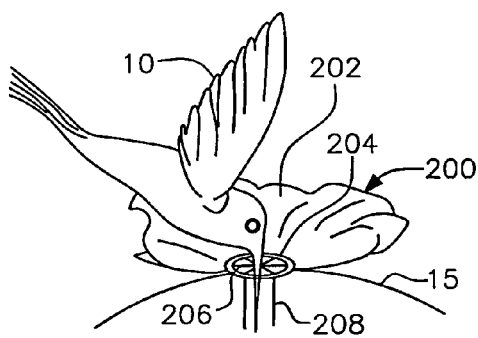
FIG. 5 is a side perspective view of a hummingbird feeding at another embodiment of a soft petal flower port on a hummingbird feeder, in accordance with the present invention.
Figure 6:
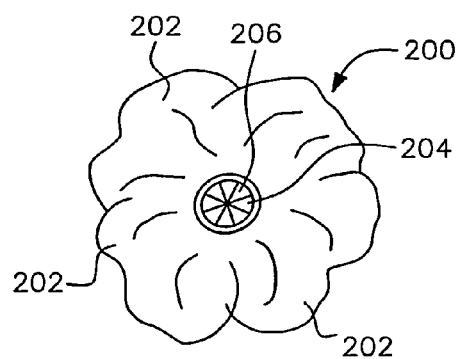
FIG. 6 is a top view of the soft petal flower port shown in FIG. 5.
Figure 7:
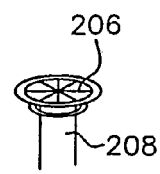
FIG. 7 is a side perspective view of the closure membrane of the soft petal flower port shown in FIGS. 5 and 6.

A second embodiment of a soft petal port 200 for a hummingbird feeder 15 is illustrated in FIGS. 5 and 6. As in the first embodiment of FIG. 4, petals 202 of flower port 200 are made of a soft and durable material having a low durometer reading (i.e. below 50A) so that the petals can be easily moved and manipulated by a feeding hummingbird. In addition, in this embodiment, flower port opening 204 includes a central membrane 206 that covers the top of the nectar channel 208 from which the hummingbird draws nectar stored in the feeder 15. Membrane 206 acts to both keep pests (such as bees) out of the nectar, and help prevent leakage of nectar from the feeder through port opening 204.

Figure 8:
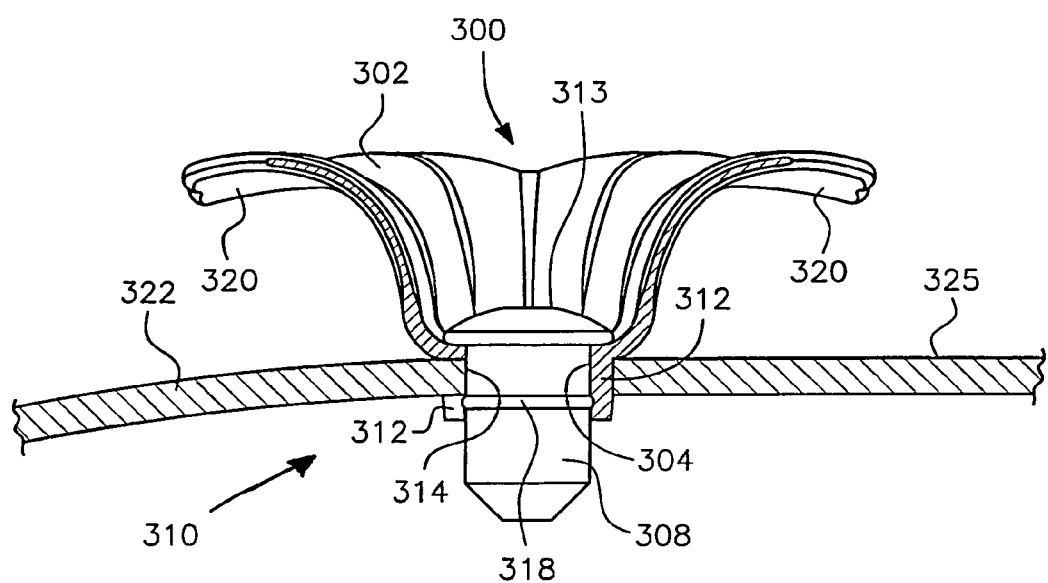
FIG. 8 is a partial cross-sectional view of another embodiment of a soft petal flower in accordance with the present invention, shown engaged in the opening of the feeder basin and held in place by a different closure unit.
Figure 9:
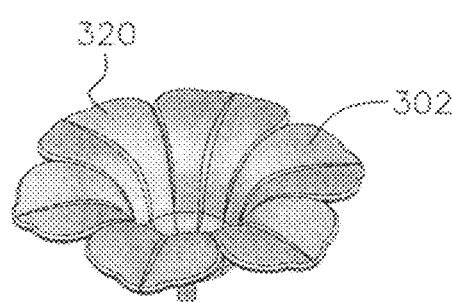
FIG. 9 is a top perspective view of the soft petal flower port shown in FIG. 8.

In a preferred embodiment, as shown in FIG. 8, a flower port, generally designated by reference numeral 300, has a soft petal flower 302 with a central opening 304 and a bee guard or plug 308 inserted therein. Plug 308 has a longitudinal through opening 309 which is sufficiently narrow that larger pests—such as bees—are prevented from entering the reservoir section 310 of the feeder. Plug 308 can be made of the same or a similar material to flower petal 302, or a more rigid material. Alternatively, flower port opening 304 can simply be made narrow enough to keep out larger pests.

FIGS. 9-14 illustrate specific component parts of the flower port shown in FIG. 8. In particular, FIGS. 9-12 show a soft petal flower 302 shaped as a petunia flower, but other flower shapes can be used, such as hibiscus and impatiens for example. Also, various colors can be used, as desired, such as white, yellow and red for example, and the flower 302 and the plug 308 can be of the same color or different colors.

Figure 10:
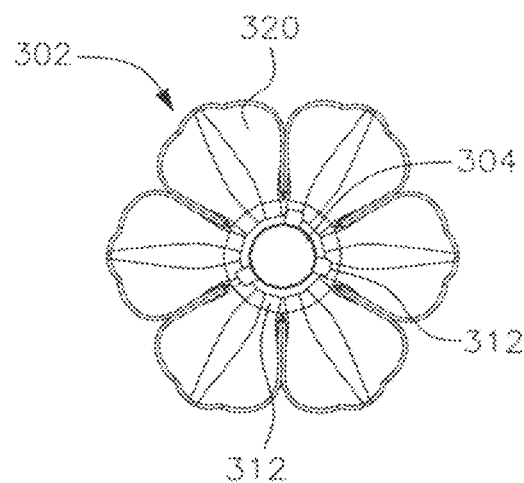
FIG. 10 is a bottom view of the soft petal flower in FIG. 9 showing the tabs for holding the flower in the feeder basin opening.
Figure 11:
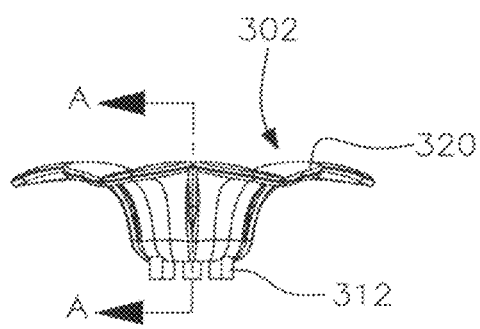
FIG. 11 is a side view of the soft petal flower in FIG. 9 also showing the tabs.
Figure 12:
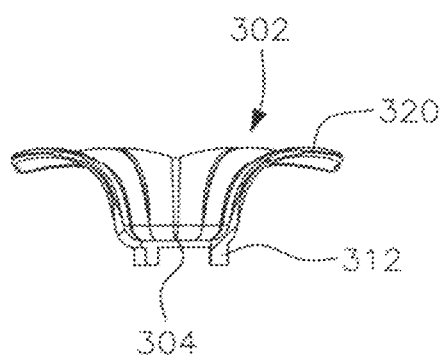
FIG. 12 is a sectional view taken along line A-A of FIG. 11.

As shown in FIGS. 10-12, the base of the soft petal flower 302 includes a plurality of depending tabs 312, preferably three in number, which engage the inner surface 314 of the opening in the top of the nectar basin 322 which receives tabs 312 and plug 308, as shown in FIG. 8. The tabs 312 are spaced from one another and arranged to define a substantially circular inserting structure for the flower.

Figure 13:
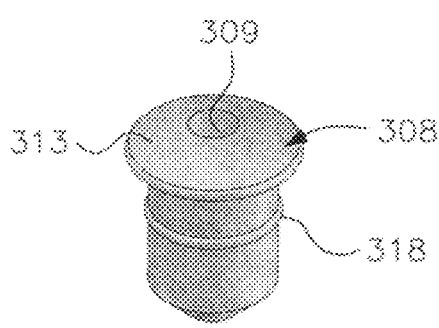
FIG. 13 is a side perspective view of the closure unit of the soft petal flower port shown in FIG. 8.
Figure 14:
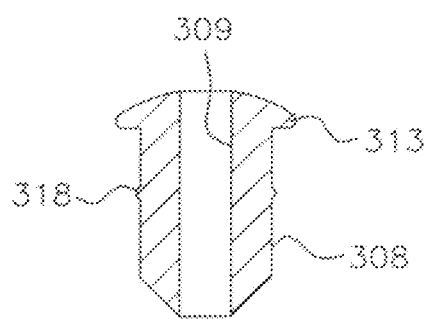
FIG. 14 is a cutaway side view of the closure unit of the soft petal flower port shown in FIG. 13.

As shown in FIGS. 8, 13 and 14, the plug 308 has a generally cylindrical body made of a flexible material. The plug has an outer circumference sized to be received within the substantially circular inserting structure formed by the spaced tabs. The head 313 of the plug ensures that the central opening in the flower is fully covered.

The plug also has a protruding ring 318 around its outer circumference. The outer circumference of the ring 318 is greater than an inner diameter of the feeding basin apertures defined by inner surface 314 so that, when the flower tabs 312 are inserted into the basin opening and plug 308 is pressed into the flower opening 304, the ring 318 flexes to pass through the aperture and snaps back out to secure the plug and the flower 302 within the basin aperture with a snap fit, as shown in FIG. 8.

Figure 15:
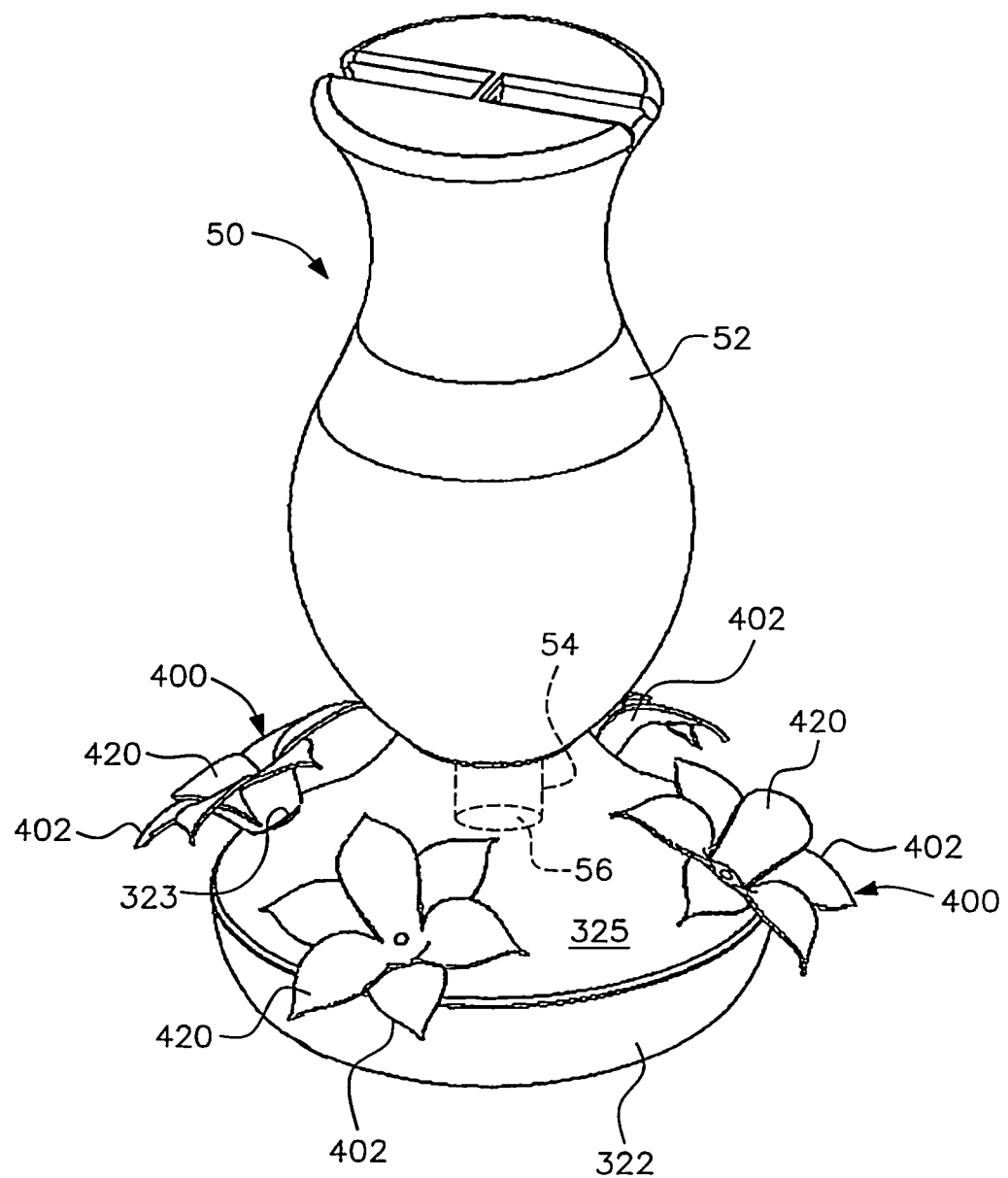
FIG. 15 is a hummingbird feeder with a plurality of soft petal flower ports in accordance with the present invention.

The present invention is also directed to a hummingbird feeder generally designated by reference numeral 50, having soft petal flower ports generally designated by reference numeral 400, as shown generically in FIG. 15. The feeder 50 includes a reservoir 52 for containing liquid nectar that has a lower end 54 with a bottom opening 56, and a feeding basin 322 coupled to the reservoir lower end 54 and in fluid communication with the reservoir 52 through the bottom opening 56. The connection between the reservoir 52 and the feeding basin 322, and an associated valve mechanism for controlling nectar flow, may be embodied in various ways as is disclosed in the art. A representative feeder into which the soft petal flower ports according to the present invention may be incorporated is the top-fill hummingbird feeder shown in U.S. Publ. No. 2009/0320765 which is commonly owned by the assignee of the present application. The soft petal flower ports may also be incorporated within bottom fill hummingbird feeders such as that shown in U.S. Pat. No. 7,685,969, also commonly owned by the assignee of the present application.

The feeding basin 322 includes a plurality of apertures 323 formed in an upper surface 325 thereof through which hummingbirds can access nectar held in the feeding basin (see FIG. 8). A plurality of soft petal flower ports 400 are respectively received within the plurality of apertures 323 and secured therein, with each soft petal flower port 400 including a three-dimensional flower 402 with soft pliable petals 420 having a level of flexibility consistent with natural flowers and leaves.

Regardless of the configuration of the soft petal flower to emulate existing flower shapes, or the color scheme selected, it is preferable that the flower petals 320, 420 be spaced away from the upper surface 325 of the nectar basin 322, as shown in FIGS. 8 and 15. This spacing of the petals 320, 420 coupled with their flexible properties allows the petals to readily deflect upon contact by the hummingbird. This helps to ensure that injury is avoided in the event a hummingbird's flapping wings accidentally encounters a petal 320, 420.

The soft petal feeding ports according to the present invention are removable and replaceable such that different styles of simulated flowers can be secured to the feeder to vary the appearance and possible attractiveness of the feeder to the hummingbirds.

When molding a material having a durometer reading of no more than 50A based on ASTM standard D2240 into the shape of a flower as described herein, the result is a soft hummingbird feeder port that simulates the appearance and texture of natural flowers. This natural look and feel attracts more hummingbirds to the feeder as compared with the prior art designs, and provides the hummingbirds with a safer and more natural feeding environment.

The foregoing descriptions and drawings should be considered as illustrative only of the principles of the invention. The invention may be configured in a variety of shapes and sizes and is not limited by the dimensions of the preferred embodiment. Therefore, it is not desired to limit the invention to the specific examples disclosed or the exact construction and operations shown and described. Rather, all suitable modifications and equivalents may be resorted to, falling within the scope of the invention.

What is claimed is:

1. A hummingbird feeder comprising:
   a reservoir for containing liquid nectar, said reservoir having a lower end with a bottom opening;
   a feeding basin coupled to said reservoir lower end and in fluid communication with said reservoir through said bottom opening, said feeding basin having a plurality of apertures formed in an upper side thereof through which hummingbirds can access nectar held in said feeding basin;
   a plurality of soft petal flower ports respectively received within said plurality of apertures and secured therein, each soft petal flower port including a three-dimensional flower with soft pliable petals made of a polymer having a durometer reading of not greater than 50A to give the petals a level of flexibility consistent with natural flowers and leaves, said flower petals being spaced away from an upper surface of said feeding basin, each of said soft petal flowers including,
   a central opening in alignment with a respective aperture;
   a plug fitted within said central opening, said plug having a longitudinal through opening that is smaller than said flower central opening to prevent pests from accessing the nectar in said basin but large enough to accommodate a hummingbird's beak; and
   a plurality of depending tabs which engage an inner surface of a respective feeding basin aperture when the soft petal flower port is coupled to said feeding basin, said tabs being spaced from one another around the feeding basin aperture and arranged to define a substantially circular inserting structure for flower;
   each of said plugs having a generally cylindrical body made of a flexible material and having an outer circumference sized to be received within said substantially circular inserting structure, each of said plugs further having a protruding ring around said outer circumference, an outer circumference of said ring being greater than an inner diameter of said feeding basin apertures so that, when the soft petal flower port is fully pressed into the feeding basin aperture, said ring flexes to pass through the aperture and snaps back out to secure said plug within said basin aperture with a snap fit.

* * * * *